United States Patent
Gabrys et al.

(10) Patent No.: US 12,531,497 B2
(45) Date of Patent: Jan. 20, 2026

(54) OPTIMIZED MOTOR DRIVE FOR AIR CORE MOTORS

(71) Applicants: Christopher Gabrys, Reno, NV (US); Timothy Rodgers, Bainbridge Island, WA (US)

(72) Inventors: Christopher Gabrys, Reno, NV (US); Timothy Rodgers, Bainbridge Island, WA (US)

( * ) Notice: Subject to any disclaimer, the term of this patent is extended or adjusted under 35 U.S.C. 154(b) by 111 days.

(21) Appl. No.: 18/548,096

(22) PCT Filed: Mar. 25, 2022

(86) PCT No.: PCT/US2022/022049
§ 371 (c)(1),
(2) Date: Aug. 27, 2023

(87) PCT Pub. No.: WO2022/187755
PCT Pub. Date: Sep. 9, 2022

(65) Prior Publication Data
US 2024/0136960 A1  Apr. 25, 2024
US 2024/0235440 A9  Jul. 11, 2024

Related U.S. Application Data

(60) Provisional application No. 63/215,498, filed on Jun. 27, 2021.

(51) Int. Cl.
*H02P 6/182* (2016.01)
*H02P 6/10* (2006.01)
*H02P 27/06* (2006.01)

(52) U.S. Cl.
CPC ............... *H02P 6/182* (2013.01); *H02P 6/10* (2013.01); *H02P 27/06* (2013.01)

(58) Field of Classification Search
CPC .. H02P 27/06; H02P 6/10; H02P 6/182; H02P 2207/05
See application file for complete search history.

(56) References Cited

U.S. PATENT DOCUMENTS 4,864,483 A  9/1989  Divan
5,825,597 A * 10/1998  Young ................... H02P 6/085
                                                318/811

(Continued)

OTHER PUBLICATIONS

R. Carlson, M. Lajoie-Mazenc and J. C. d. S. Fagundes, "Analysis of torque ripple due to phase commutation in brushless DC machines," in IEEE Transactions on Industry Applications, vol. 28, No. 3, pp. 632-638, May-Jun. 1992, doi: 10.1109/28.137450.
Takahashi, T. Koganezawa, G. Su and K. Ohyama, "A super high speed PM motor drive system by a quasi-current source inverter," in IEEE Transactions on Industry Applications, vol. 30, No. 3, pp. 683-690, May-Jun. 1994, doi: 10.1109/28.293717.

(Continued)

*Primary Examiner* — Thai T Dinh
(74) *Attorney, Agent, or Firm* — Patwrite Law; Mark David Torche

(57) ABSTRACT

An electronic motor drive for powering permanent magnet air core synchronous motors having sinusoidal back emf includes a switchmode power converter coupled to a connection of an input power supply. The power converter converts power from the input power supply with a current-mode control output and regulates current to a variable voltage link that supplies the regulated current to a non-modulating commutation inverter that energizes multi-phase air core armature windings of the air core motor. The motor drive employs 6-step position sensorless commutation exciting only two phase legs at a time controlled through measurement of the back emf. The switchmode power converter includes a low pass inductance and capacitance filter ahead of a power supply of the commutation inverter. The regulated current is switched at a regulation frequency high enough to preclude significant switching-induced harmonic ripple currents to the air core armature windings.

20 Claims, 11 Drawing Sheets

(56) References Cited

U.S. PATENT DOCUMENTS

| | | | |
|---|---|---|---|
| 5,984,211 | A | 11/1999 | Sugimoto et al. |
| 6,469,469 | B1 | 10/2002 | Chambers et al. |
| 7,042,182 | B2 | 5/2006 | Hahn et al. |
| 7,411,325 | B1 * | 8/2008 | Gabrys ............... H02K 11/33 |
| | | | 310/68 R |
| 7,888,839 | B2 | 2/2011 | Gabrys et al. |
| 8,637,771 | B1 | 1/2014 | Yankie et al. |
| 8,884,562 | B1 | 11/2014 | Cameron, Jr. |
| 9,318,991 | B2 | 4/2016 | Benson et al. |
| 9,425,644 | B1 | 8/2016 | Dellacona et al. |
| 9,548,684 | B1 | 1/2017 | Cameron, Jr. |
| 9,831,805 | B2 | 11/2017 | Bian |
| 11,081,984 | B2 * | 8/2021 | Gabrys ................ H02K 3/47 |
| 11,670,987 | B1 * | 6/2023 | Gabrys ............... H02K 21/22 |
| | | | 310/54 |
| 2004/0108789 | A1 | 6/2004 | Marshall |
| 2009/0146619 | A1 | 6/2009 | Jansen et al. |
| 2010/0315027 | A1 | 12/2010 | Wystup et al. |
| 2020/0313526 | A1 * | 10/2020 | Gabrys ................ H02K 3/28 |
| 2020/0358380 | A1 * | 11/2020 | Gabrys ................ H02P 6/28 |
| 2021/0028729 | A1 | 1/2021 | Cox |

OTHER PUBLICATIONS

Z. Xiaofeng and Lu Zhengyu, "A New BLDC Motor Drives Method Based on Buck Converter for Torque Ripple Reduction, "2006 CES/IEEE 5th International Power Electronics and Motion Control Conference, 2006, pp. 1-4, doi: 10.1109/IPEMC.2006.4778134.

Ki-Yong Nam, Woo-Taik Lee, Choon-Man Lee and Jung-Pyo Hong, "Reducing torque ripple of brushless DC motor by varying input voltage," in IEEE Transactions on Magnetics, vol. 42, No. 4, pp. 1307-1310, Apr. 2006, doi: 10.1109/TMAG.2006.871937.

H. Le-Huy, R. Perret and R. Feuillet, "Minimization of Torque Ripple in Brushless DC Motor Drives," in IEEE Transactions on Industry Applications, vol. IA-22, No. 4, pp. 748-755, Jul. 1986, doi: 10.1109/TIA.1986.4504787.

Jing, Jianli. (2018). A torque ripple suppression technique for brushless DC motor based on PFC buck converter. EICE Electronics Express. 15. 10.1587/elex.15.20180145.

Chen, Hung-Chi & Huang, Hung-He. (2013). Design of buck-type current source inverter fed brushless DC motor drive and its application to position sensorless control with square-wave current. Electric Power Applications, IET.7. 416-426. 10.1049/iet-epa.2013.0002.

* cited by examiner $C = 0$

C = Large

C = Optimal

| Problem | Solution |
|---|---|
| Cogging torque ripple from slotted motor stator construction with magnetic attraction to motor poles  231 | Use an air core motor construction without ferromagnetic stator pole teeth  232 |
| Substantial commutation torque ripple at higher speeds from inability to increase current in phase winding inductance fast enough  233 | Use an air core motor construction with very low motor inductance and fast current response time  234 |
| Harmonic losses in stator backiron from high frequency PWM switching in the drive output inverter combined with low motor stator inductance  235 | Use a variable DC link to supply a non-modulated commutation-only drive output inverter  236 |
| Current and torque ripple from output inverter waveform mismatching with motor back emf waveform  237 | Supply the variable DC link from a high frequency buck converter operating in current-mode control with a "Goldilocks" filter, so drive output voltage waveform emulates back emf waveform. Phase currents become near flat-top rectangular waves  238 |
| Torque ripple from freewheeling diode and off-switching phases continuing to conduct current, when motor is at slow speed  239 | Buck converter supplying the variable DC link maintains constant current to the drive output inverter during commutation  240 |
| Torque ripple from on-switching phase currents not rising fast enough when motor is at high speed  241 | Buck converter supplied from high voltage input that is preferably twice or greater than the peak back emf, so phase currents can turn on faster  242 |

OPTIMIZED MOTOR DRIVE FOR AIR CORE MOTORS

This invention pertains to electronic motor drives specially compatible for powering air core motors with sinusoidal back emf, and more particularly to an optimized drive that uniquely provides high efficiency power conversion with greatly simplified and more reliable commutation than with conventional type sine wave d rives. The motor drive's operation further specifically minimizes the generation of motor torque ripples for both smooth rotation and high combined motor and drive efficiency. The new motor drives are also low cost to produce.

BACKGROUND OF THE INVENTION

There is much effort presently being undertaken to develop new electric motors and generators that can provide higher efficiency power conversion between electrical and rotary mechanical energy. Simultaneously, efforts are also focused on reducing the amount of materials utilized and reducing manufacturing costs, while attaining higher efficiency. New electric machines that can achieve higher power conversion efficiency, but are more costly than current traditional machines, are less likely to be well-accepted into the marketplace if at all. The industry-wide goal is to provide higher efficiency and also have lower costs.

Development of new electric motors for achieving higher efficiency is mostly focused on use of synchronous topologies, which require the use of a variable frequency inverter, or motor drive, to operate. Use of electronic inverters is also becoming commonplace as a means to increase operational efficiency with all motors by varying the rotational speed, which supports the emergence of new synchronous motors. One type of synchronous motors that have the potential to provide both the highest efficiency and the lightest motor weight are air core motors, depending on the design and manufacturing used. Air core motors differ from conventional slotted motors by their windings being located directly within the magnetic airgap, instead of being wound around ferromagnetic stator poles. This construction without ferromagnetic stator poles can greatly reduce magnetic induced stator losses from eddy currents and hysteresis. However, air core motor construction also inadvertently results in a dramatically reduced armature winding inductance. To date, the low inductance windings of air core motors have made them more challenging for motor drives to properly drive them. Additionally, for the highest performance air core motor versions, they utilize a high pole count to reduce motor weight. This increased pole count requires higher than typical motor drive fundamental frequency capability, further making the task of driving them yet more difficult.

Some of the other problems encountered trying to utilize conventional motor drives with high performance air core motors are the generation of switching-induced harmonic ripple currents in the armature windings, which can be significant when they cause commercially unacceptable added motor losses, inaccurate and unreliable commutation, and very complex control. Switching harmonic ripple currents can be reduced by adding line inductors between the motor and drive, but this solution is undesirable because the inductors add unacceptable size, weight, losses and costs. Likewise, rotor position sensors can be added to make commutation more accurate and reliable, but these also add significant unwanted complexity and costs. A further problem that can be encountered is the generation of significant current and torque ripples, which both undesirably increase losses and add noise and vibration.

Accordingly, a new motor drive specifically compatible for use with air core motors is needed that is optimized to provide reliable, smooth operation with a much improved combined motor and drive efficiency. The optimized motor drive for air core motors should have also completely reliable and highly accurate commutation while having minimized costs.

SUMMARY OF THE INVENTION

Typically as known in the art, it is best to drive sinusoidal motors with sine wave drives. Likewise, it is known in the art to be best to drive trapezoidal BLDC, brushless DC, motors with 6-step drives. The new motor drive provides 6-step commutation with sinusoidal-shaped-top voltage output with rectangular current waveforms for achievement of the best benefits of both types. The invention provides an electronic motor drive uniquely compatible for powering air core motors with sinusoidal back emf. The motor drive provides for high combined drive and motor operating efficiency while minimizing generation of torque ripple. It accomplishes this with a low cost construction and enables a highly reliable commutation. The invention comprises an electronic motor drive for powering permanent magnet air core synchronous motors having sinusoidal back emf. The motor drive comprises a switchmode power converter coupled to a connection of an input power supply. The power converter converts power from the input power supply with a current-mode control output and provides regulated current to a variable voltage link. The variable voltage link is coupled to and supplies the regulated current to a non-modulating commutation inverter that energizes multi-phase air core armature windings of the air core motor. The motor drive employs 6-step position sensorless commutation exciting only two phase legs at a time controlled through measurement of the back emf. The switchmode power converter comprises a low pass inductance and capacitance filter ahead of a power supply of the commutation inverter, wherein the regulated current is switched at a regulation frequency high enough to preclude significant switching induced harmonic ripple currents to the air core armature windings combined with the filter inductance having a value that is less than the inductance of the multi-phase windings as measured across two legs of the windings. The low pass filter inductance and capacitance simultaneously have values low enough to allow the output voltage of the motor drive to track the sinusoidal shape of the back emf waveforms during conduction periods of the output inverter. Significant switching harmonic ripple currents would be those that reduce the motor electrical efficiency multiplied by 10% of the value without them. Six-step commutation provides for more accurate and reliable commutation particularly with low inductance air core motors because one phase is left unenergized and zero crossing of voltage and current can be readily measured. There are two regions of operation of six-step drives; conduction which occurs when two phase windings are energized, and commutation which occurs as one phase winding is being turned off and another phase winding is being turned on. In an additional embodiment, the current regulation causes the voltage waveform of the variable voltage link to imitate the waveform of the back emf during the conduction regions. The response time of the converter to maintain constant current to the variable voltage link is fast enough that the resulting voltage is automatically adjusted as the back emf rises and falls due to passing of the motor poles over the armature phase windings. The current is maintained constant as the voltage consequently follows that of the back emf waveform. If the response time of the current regulation was too slow, the result would be generation of current and torque pulses each time the back emf and drive output voltages deviated.

The size of the low pass filter inductance and capacitance in relation to the commutation frequency and switching regulation frequency enables the output of the inverter to track the back emf waveform while also precluding development of switching harmonic ripple currents in the armature winding. In a further embodiment, the low pass inductance and capacitance filter has a cut off frequency that is less than half of the current switching regulation frequency but more than five times that of the commutation frequency of the output inverter. The switching regulation frequency is effectively blocked from causing harmonic induced losses in the stator backiron, while the output voltage can effective track the variation of the back emf during conduction periods of the output inverter.

In an additional embodiment of the invention, the motor drive simultaneously provides sinusoidal-shaped-top 6-step voltage waveform with a rectangular shaped 6-step current waveform to the air core armature windings during the conduction periods of the output inverter. Unlike traditional trapezoidal BLDC motor drives that provide a trapezoidal output voltage waveform, the motor drive in accordance with the invention combines a rectangular current waveform with a sinusoidal shape top waveform to eliminate generation of conduction current and torque ripple. Such ripple would cause undesirable vibration as well as increased losses in the motor and drive.

Torque ripple with use of six-step drives results from both the conduction periods of the output inverter and also separately during the commutation periods when one phase winding is being switched off and another switched on. When the phase being switched on cannot turn on fast enough because of the inductance delay from increasing current, this causes current and torque ripple at higher speeds. During the commutation regions, the phase winding being turned off cannot turn completely off immediately due to the stored inductive energy and conduction through the associated freewheeling diode in the inverter bridge. Likewise, the phase winding being turned on cannot turn completely on immediately due to the inductive time constant of that winding. For slow speeds, the turn off time may be slower than the turn on time and this is reversed at high speeds. The difference in the turn off and turn on times can result in torque ripples. The solution is the converter maintaining the constant current to the variable voltage link, by enabling the converter to increase the resulting voltage across the link as high as necessary when required. The voltage of the variable voltage link will automatically vary during the commutation regions in order to maintain near constant current, resulting in minimized commutation torque ripple. To increase the rate of increasing current into a phase winding, the voltage supplied must preferably be increased. In yet a further embodiment, the current regulation combined with the low pass filter causes the voltage waveforms supplied by the motor drive to the multi-phase air core armature windings to imitate the shape of the back emf waveforms during the conduction periods of the output inverter, and the motor drive increases the voltage to the variable voltage link during commutation periods of the output inverter. The higher voltage across the armature winding enables the current to be increased through it more rapidly, such that constant torque can be achieved.

A preferred embodiment of the invention to accomplish this prevention of commutation torque ripple is with the supply voltage to the switchmode converter. The supply power has a peak voltage that is at least twice the maximum peak value of the back emf measured across two legs of the air core motor windings when the motor is operating at full speed, thereby reducing commutation torque ripple of the air core synchronous motor and enabling the voltage of the variable voltage link to be higher during commutation periods than the conduction periods of the output inverter. The converter is thereby adapted to maintain substantially constant current to the commutation inverter during both conduction and commutation regions over substantially the entire operating speed range of the air core motor.

In a further embodiment of the invention, power factor, THD as well as size, costs and reliability may be further increased. Because the regulation from the switchmode converter is based on current-mode regulation, the input supply power voltage need not be strictly regulated. Typically the regulation of voltage after a rectifier is provided by utilizing a sufficiently large capacitance. Unfortunately this capacitance causes both an undesirable reduction in power factor as well as a distorted current waveform or total harmonic distortion. Accordingly, the motor drive in accordance with the invention preferably reduces these deficiencies. The power supply comprises AC utility power which is converted to DC by an uncontrolled rectifier prior to being supplied to the switchmode power converter, wherein filter capacitance across the DC and after the uncontrolled rectifier is sufficiently low such that the power factor reflected to the AC utility power exceeds 0.90 without the use of any active power factor correction.

A key to the preferred embodiment is the use of a much higher switching regulation frequency than the commutation frequency of the armature phase windings of the motor. This large difference allows for a low pass filter sufficiently far away from both frequencies to provide for the functioning of the motor drive. However, use of very high switching regulation frequencies can result in undesirable switching losses and reduced efficiency of the motor drive. One way to reduce switching losses in the switchmode converter at high frequency is through the use of soft switching. Unlike conventional motor drives wherein current regulation switching typically occurs in the output inverter. The preferred motor drive, in accordance with the invention, accomplishes the regulation switching in the switchmode converter prior to supply of the output inverter. Accordingly, in an additional embodiment of the invention, the switchmode power converter comprises a quasi-resonant buck converter.

In another embodiment, the invention comprises an electronic motor drive for powering permanent magnet air core synchronous motors having sinusoidal back emf. The motor drive comprises a switchmode power converter coupled to a connection of input supply power that converts the supply power with a current-mode control output and provides regulated current to a variable voltage link. The variable voltage link is coupled to and supplies the regulated current to a non-modulating commutation inverter that energizes multi-phase air core armature windings of the air core motor. The motor drive employs stepped commutation exciting only some of said phase legs at a time, controlled through measurement of the back emf. The switchmode power converter comprises a low pass inductance and capacitance filter prior to the variable voltage link supplying the commutation inverter, wherein the current regulation combined with the low pass filter causes the voltage waveform of the variable voltage link to imitate the combined back emfs of the multi-phase air core armature windings during the conduction periods of the commutation inverter and spikes the voltage of the variable voltage link during the commutation periods of the commutation inverter. Contrary to teachings in the art to avoid voltage spikes, we have found that controlled and limited voltage spikes can be desirable for the motor drive operation to reduce commutation torque ripple while not undesirably affecting the life of the armature windings or motor drive. During commutation, the switchmode converter boosts the voltage to the variable voltage link and this may be limited by changing to voltage-mode control during commutation. If the input supply voltage is not greatly higher than the back emf, the switchmode converter need not change operation from current-mode control.

Significant benefits of the motor drive can be exploited by the lack of need for voltage regulation. These can reduce the size the motor drive while also bolstering efficiency. In yet a further embodiment, the invention comprises an electronic motor drive for powering permanent magnet air core synchronous motors having sinusoidal back emf. The motor drive comprises a switchmode power converter coupled to a connection of supply power that converts the supply power with a current-mode control output and provides regulated current to a variable voltage link. The variable voltage link is coupled to and supplies the regulated current to a non-modulating commutation inverter that energizes multi-phase air core armature windings of the air core motor. The motor drive employs 6-step position sensorless commutation exciting only two phase legs at a time controlled through measurement of back emf. The supply power comprises three-phase sinusoidal AC voltage of fixed supply power voltage amplitude and supply power frequency. A rectifier connected to the supply power converts the supply power voltage into an input DC voltage with ripple having six times the frequency of the supply power frequency. The switchmode power converter supplied by the rectifier comprises a buck converter with low pass inductance and capacitance filter that converts the input DC voltage with ripple into variable voltage link DC voltage with ripple having a higher frequency higher than the input DC voltage with ripple. The non-modulating commutation inverter coupled to the variable voltage link converts the variable link DC voltage with ripple into three-phase AC motor supply power, with each phase voltage comprising sinusoidal-shaped-top 6-step voltage waveforms having frequency equal to $1/6^{th}$ the frequency of the variable voltage link DC voltage with ripple.

Additionally, the current regulation combined with the low pass filter causes the voltage waveform of the variable voltage link to imitate the combined back emfs of the multi-phase air core armature windings during the conduction periods of the output inverter and spikes the voltage of the variable voltage link during the commutation periods of the output inverter. The combined back emfs of the phase windings is simply the rectified waveform as conducted in reverse through the freewheeling diodes of the output inverter.

DESCRIPTION OF THE DRAWINGS

The invention and its many advantages and features will become better understood upon reading the following detailed description of the preferred embodiments in conjunction with the following drawings, wherein:

FIG. 9 is a table illustrating the different conventional problems of six-step motor drives with motors and related solutions that were utilized to overcome each in accordance with the invention.

DESCRIPTION OF THE PREFERRED EMBODIMENT

Figure 1:
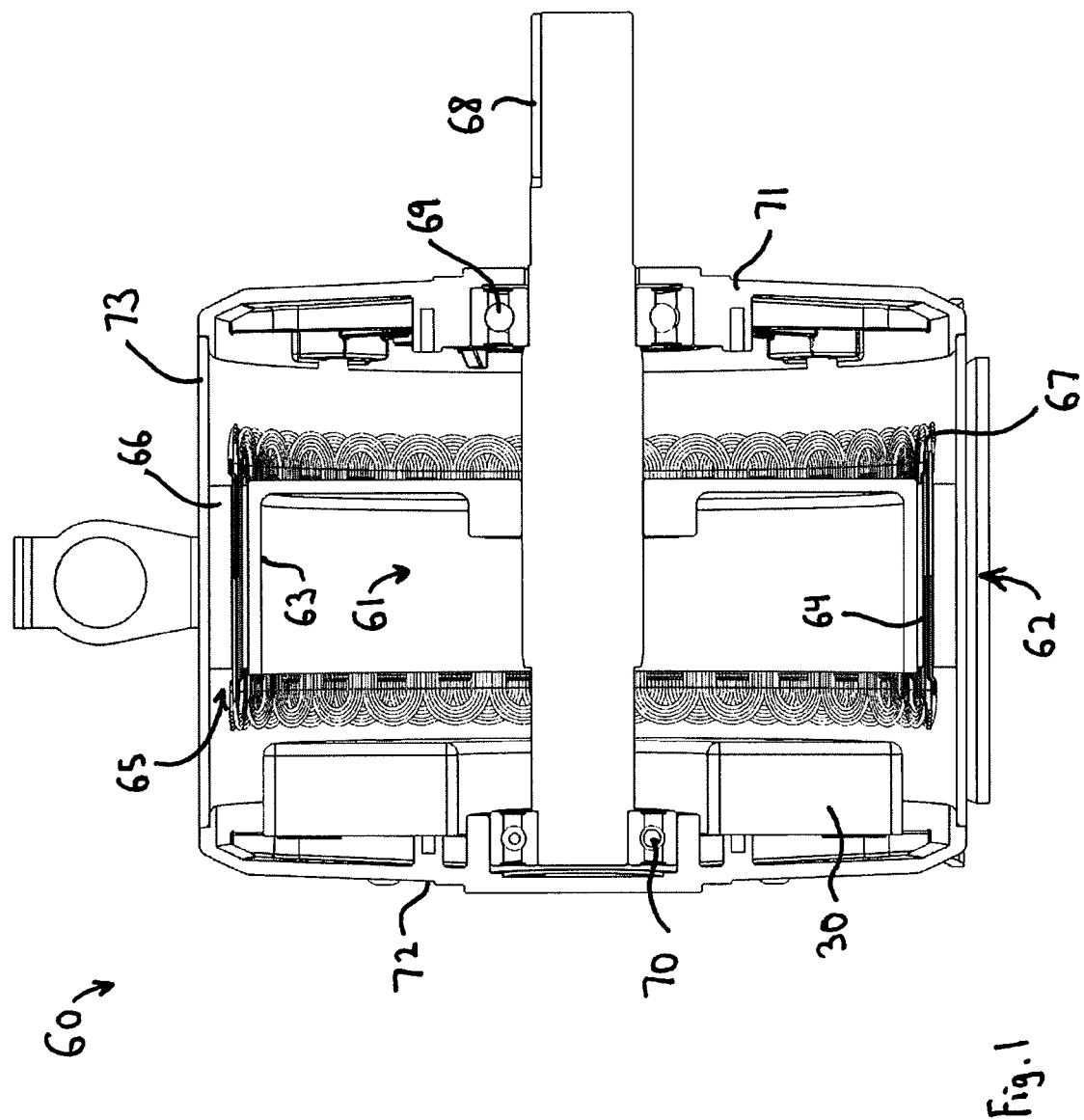
FIG. 1 is a side view of an air core motor with sinusoidal back emf for use with a motor drive in accordance with the invention.

Turning to the drawings, wherein like reference characters designate identical or corresponding parts, a side view of an air core motor with sinusoidal back emf for use with a motor drive in accordance with the invention is shown in FIG. 1. The air core motor 60 is comprised of a rotor 61 and a stator 62. The rotor 61 has a rotor backiron 63 with an attached array of alternating polarity permanent magnets 64. The magnets 64 drive magnetic flux back and forth across a magnetic air gap 65 to a laminated stator backiron 66. Low loss Litz wire windings 67 are located directly within the magnetic airgap 65 and are bonded to the stator backiron 66. The rotor 61 is attached to a center shaft 68 that is journaled for rotation by bearings 69, 70. The bearings 69, 70 are supported by housing endplates 71, 72 that are connected by outer housing tube 73. The stator backiron 66 is supported by the outer housing tube 73. The windings 67 are energized by the motor drive 30 which may be contained inside the housing tube 73 or alternatively mounted on the outside of the housing end plate 72. As the rotor 61 is rotated, it creates multiple phase sinusoidal back emf in the windings 67. Although shown with a single rotor topology, air core motors for use with the motors drive in accordance with the invention can also be constructed with windings bonded to a non-ferromagnetic form that is supported between two rotating surfaces of the rotor.

Figure 2:
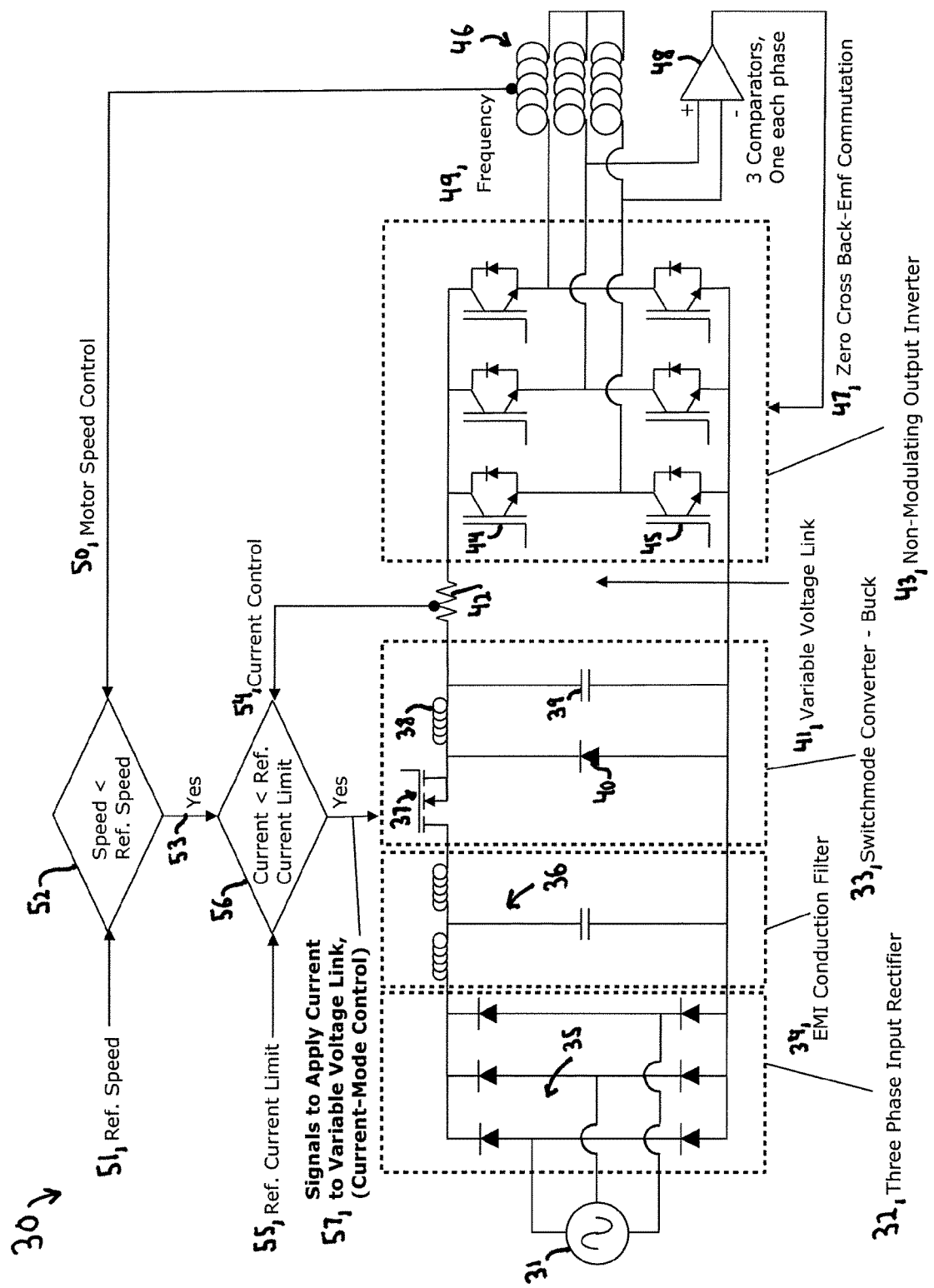
FIG. 2 is a schematic drawing of a motor drive for air core motors in accordance with the invention.

A motor drive for air core motors in accordance with the invention is shown in FIG. 2. The motor drive 30 comprises a unique six-step version of commutation that is designed to be specially suited for air core motors with sinusoidal back emf and also with very low inductance and high pole count. The drive 30 receives fixed frequency AC supply power 31 into a three phase input rectifier 35 which is coupled to an EMI conduction filter 34 that powers a switchmode power converter 33 with DC power. The EMI filter 34 utilizes an L-C-L configuration 36 to prevent switching noise from the switchmode converter 33 from propagating back to AC utility supply power 31. For DC powered transportation applications such as electric aviation, the rectifier 32 need not be used and DC power can be supplied directly to the switchmode converter 33. As shown, the switchmode converter 33 comprises a buck converter using a MOSFET 37 providing current-mode control regulation to a variable voltage link 41. The MOSFET 37 may be operated in continuous-current mode or alternately with reduced switching losses in discontinuous-current mode. Filter inductance 38, filter capacitance 39 and diode 40 complete the buck converter 33.

The buck converter 33 supplies three phase synchronous power to a non-modulating output inverter 43 for driving the motor air core armature windings 34. The converter 33 provides regulated current to the variable link 41 through current-mode control, and the voltage across the variable link 41 varies as a result while maintaining the constant current. Unlike conventional sine wave drives, the motor drive 30 provides sinusoidal top shaped six-step voltage and rectangular shaped 6-step current to the armature windings 46. The motor drive 30 also does not energize all of the windings 46 at a single time like conventional sine wave drives. For a three phase motor, only two of the three phase windings 46 are energized at a time. This makes commutation control much easier and more reliable. In addition, it eliminates the generation of common mode currents that can damage motor bearings driven from conventional sine wave PWM drives. Also unlike conventional BLDC motor drives, the motor drive 30 does not put out a trapezoidal voltage to the windings 46. Instead, the drive with special regulation and sized/designed filter, can match the sinusoidal top shape of the back emf, with output voltage, greatly reducing conduction torque ripple while also increasing efficiency.

A resistor 42 is provided in the variable link 41, which in this embodiment is the power connection between the switchmode converter 33 and the non-modulating output inverter 43 to provide for current measurement. The non-modulating commutation-only output inverter 43 provides commutation switching and comprises six IGBT transistors 44, 45 with built-in freewheel diodes in a three phase H-bridge that are energized two at a time to commutate current to the armature windings 46. The transistors 44, 45 in the output inverter 43 are each switched fully-on and fully-off in operation of the drive. Control for the commutation of the output inverter 43 is provided by zero cross monitoring 47 of the back emf each of the armature windings 46 as the rotor rotates. Commutation switching is advanced after measuring a zero crossing in phase windings 46 and sending through comparators 48. Torque control for the motor/armature current control 54 is provided through the buck converter 33 and switching of the MOSFET 37. Motor speed control 50 is provided using frequency feedback 49 in an outer loop 50 from the armature windings 46 and through turning on/off 47 the output from the converter 33 and current flow to the variable voltage link 41. Other configurations of switchmode converters 33 for providing current-mode control may also be utilized such as more than a single transistor switching and additional components to yield higher efficiency conversion.

Figure 3A:
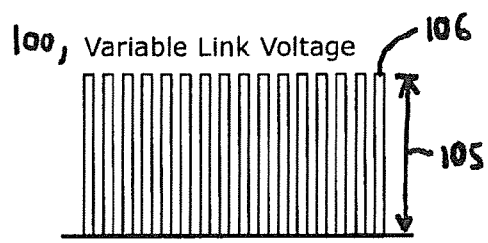
FIGS. 3A and 3B are plots of the variable voltage link regulation and drive output voltage waveforms of a motor drive with output filter capacitance set equal to zero not in accordance with the invention.
Figure 3B:
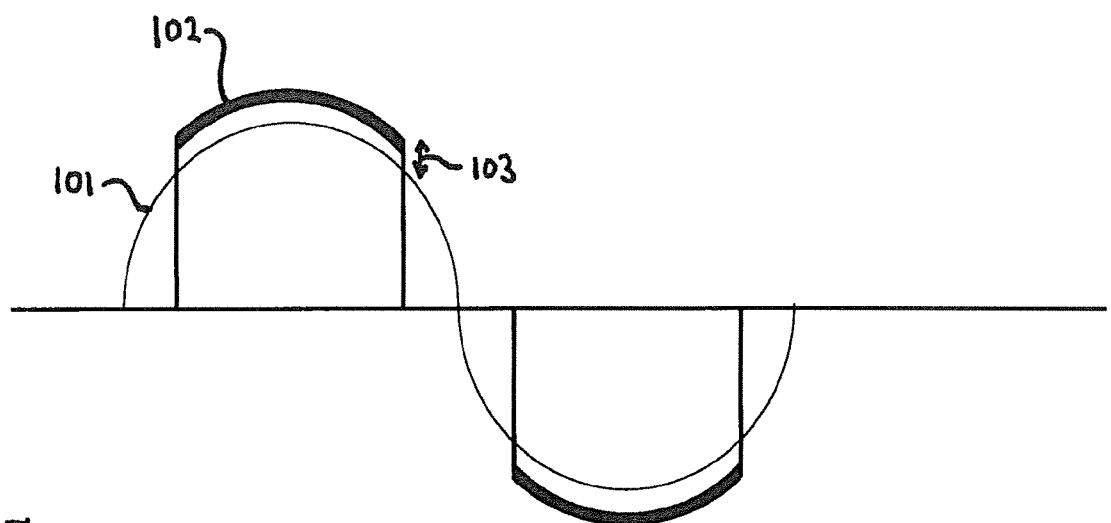

The size of the low pass filter inductance and capacitance affects the operation of the motor. Plots of the variable voltage link regulation and drive output voltage waveforms of a motor drive with output filter capacitance and inductance set equal to zero not in accordance with the invention are shown in FIGS. 3A and 3B. The variable link voltage 100 consists of high frequency pulses 105 of amplitude 106 as a result of the switching of the buck converter 33. The back emf 101 of the windings 36 is sinusoidal. The back emf 101 of only a single phase is shown. Reduction in torque pulses is achieved by the drive output waveform 102 matching the shape of the back emf waveform 101 during conduction of the output inverter 43. As shown, the drive waveform 102 matches the back emf waveform 101 with approximately uniform difference amount 103 for the current flow and torque. However, the drive output 102 has significant high frequency ripple which causes high frequency current harmonics due to the very low inductance of the armature windings. This high frequency current can cause significant magnetic induced losses in the stator backiron 66 resulting in an unacceptable reduced efficiency and resulting heating.

Figure 4A:
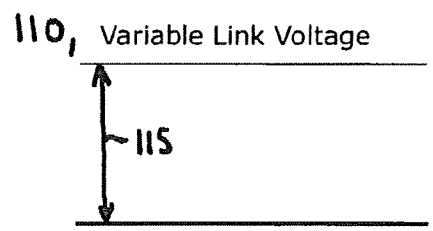
FIGS. 4A and 4B are plots of the variable voltage link regulation and drive output voltage waveforms with output filter capacitance set to be very large not in accordance with the invention.
Figure 4B:
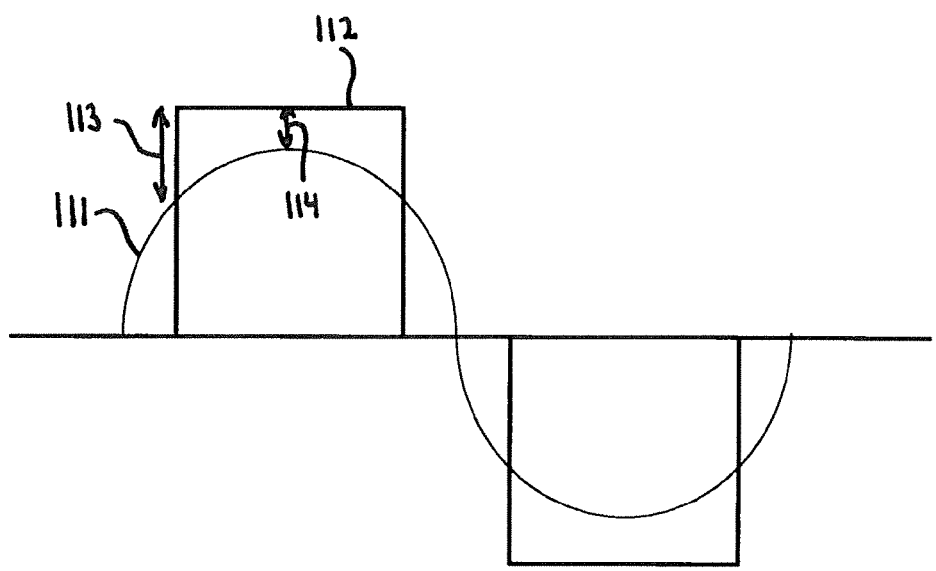

Plots of the variable voltage link regulation and drive output voltage waveforms with output filter capacitance set to be very large, and not in accordance with the invention, are shown in FIGS. 4A and 4B. The variable link voltage 110 consists of DC voltage of amplitude 115 that is only very slowly adjusted as a result of the switching of the buck converter 32. The back emf 111 of the windings 34 is sinusoidal. As shown, the drive waveform 112 is provided as a square shaped wave, fully-on and fully off. The drive output waveform 112 has a varying difference amount 114 with the back emf waveform 111 with high difference portions 113 at the drive output waveform edges which causes pulses in the current flow and torque. The torque pulses can result in undesirable vibration and noise generation, while the current pulses causing them may result in an undesirable reduction in efficiency due to periods of increased $I^2R$ resistive losses in the armature windings 36.

Figure 5A:
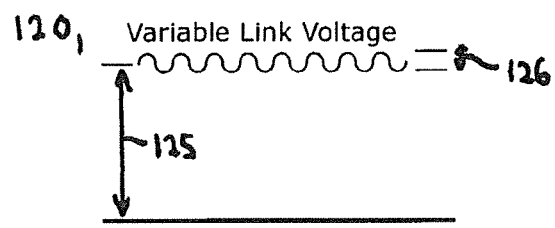
FIGS. 5A and 5B are plots of the variable voltage link regulation and drive output voltage waveforms with output filter capacitance set to an optimal value in accordance with the invention.
Figure 5B:
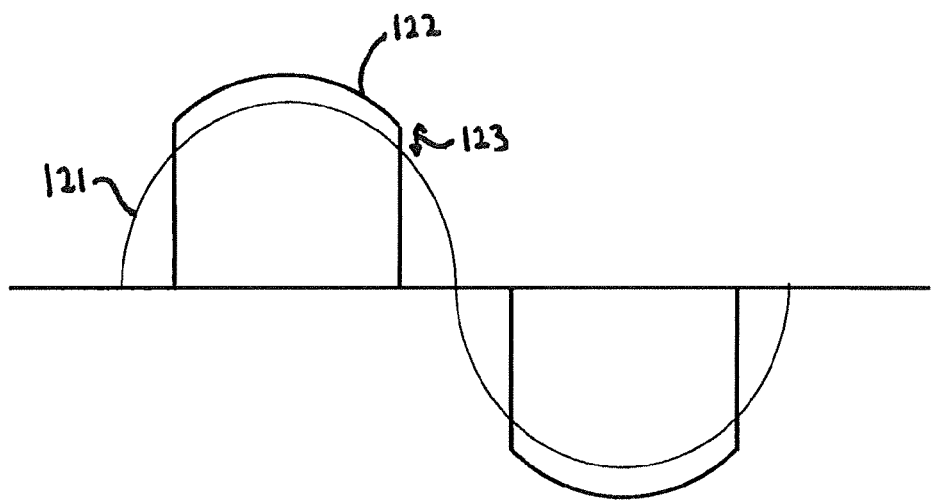

For minimizing pulses in the current flow and the resulting torque while also precluding any high frequency harmonic currents and induced losses in the stator backiron, we have found that there exists a "Goldilocks Value" of low pass filter inductance and capacitance, or filtering frequency, from the buck converter 33. This must be combined with the current regulation switching having a frequency several times higher than the commutation frequency, so that the response time of the current regulation is significantly shorter than the conduction period. Plots of the variable voltage link regulation and drive output voltage waveforms with output filter inductance and capacitance set to an optimal value in accordance with the invention are shown in FIGS. 5A and 5B. The variable link voltage 120 consists of varying DC voltage of mean amplitude 125 with a variable amplitude component 126 that is synchronized with the commutation, as the back emf waveform diverges from rectangular at the edges of the magnetic poles in air core motors. The commutation frequency is six times the fundamental frequency of the motor and the current regulation switching is preferably at least five times higher than the commutation frequency. This allows the current regulation to maintain constant current fast enough to prevent current pulses from mismatched drive output voltage waveform 122 and the back emf waveform 121 during conduction periods of the output inverter 43. Accordingly, the drive output waveform 122 imitates the back emf waveform 121 in the conduction regions. The drive output voltage waveform 122 has a uniform difference amount 123 with the back emf waveform 121 for the regulated current flow. The variable amplitude component 126 of the variable link voltage 120, which is synchronized with the commutation, reduces or eliminates any significant difference portions 123 of the configuration of the waveforms 122, 123. Likewise, the capacitance and inductance amount of filter capacitor 39 and filter inductor 38 also precludes the high frequency current harmonics (caused by the regulation switching of MOSFET 37 and at frequencies much higher and not synchronized with the commutation) from causing stator backiron losses of the configuration of FIGS. 3A and 3B.

Figure 6:
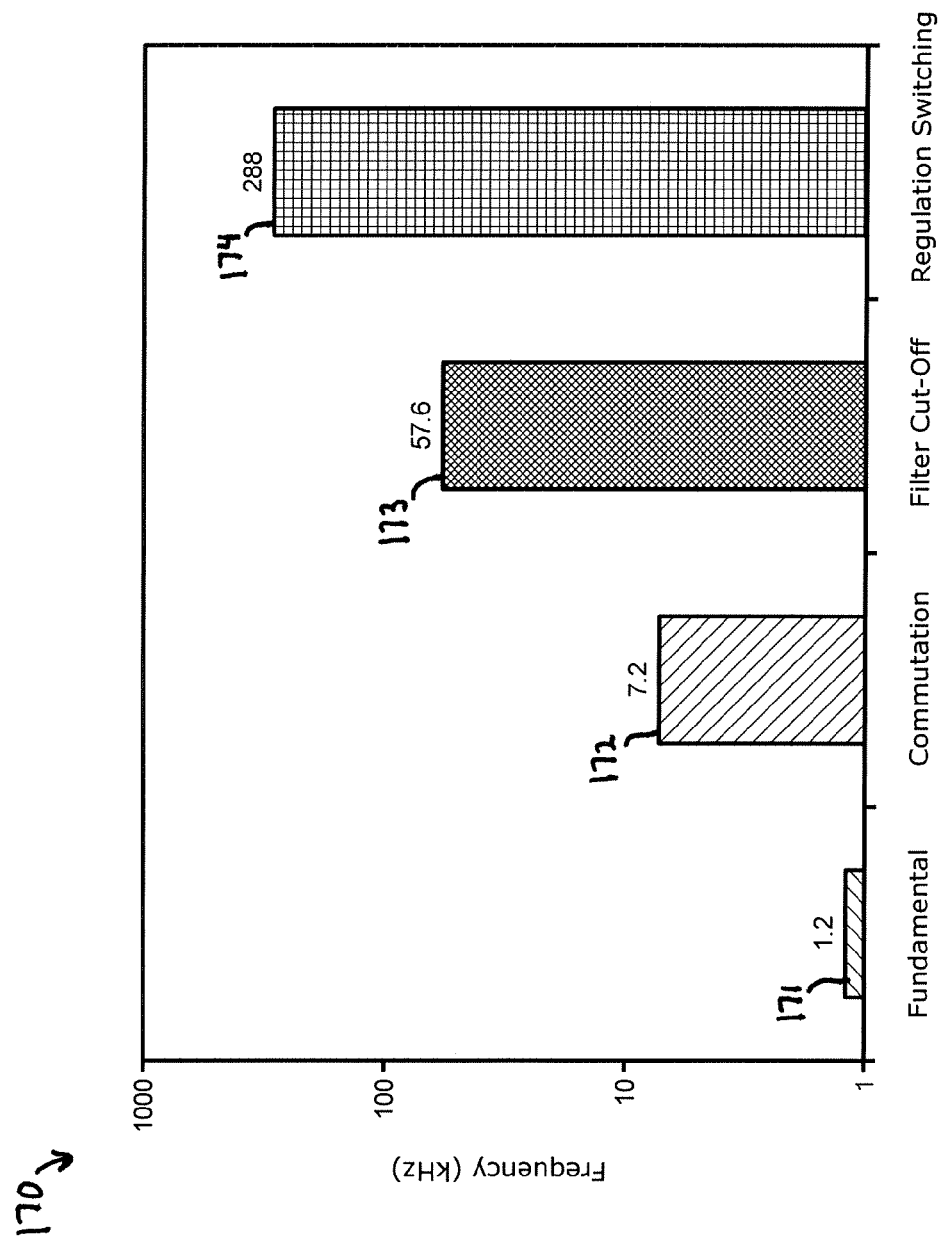
FIG. 6 is a comparison chart of the different frequencies employed in the motor drive of FIG. 2.

A comparison chart of the different frequencies employed in the motor drive of FIG. 2 is shown in FIG. 6. The comparison 170 shows the fundamental frequency 171, commutation frequency 172, low pass filter cutoff frequency 173 and regulation switching frequency 174 of the buck converter 33, all on a logarithmic scale. For a 40 pole motor, the fundamental frequency 171 is 1.2 kHz and the frequency of the six-step commutation 172 is six times that or 7.2 kHz. The current regulation switching 173 is preferably much higher to allow filtering out high frequency switching ripple and still have fast enough response time to vary the dc voltage and preclude current pulses from varying sinusoidal varying back emf As shown low pass filter cut off frequency 173 is eight times higher than the commutation frequency 172, or 57.6 kHz. The cut off frequency of the low pass filter inductance 38 and capacitance 39 is equal to 1/(2 pie (L C)^½). Additionally, the regulation switching frequency is set at five times higher or 288 kHz. This allows the low pass filter 38, 39 to effectively filter out all of the regulation switching (preventing switching harmonic losses) while at the same time allows for the current-mode control 57 to accurately track the sinusoidal back emf shape from the output inverter 43 (preventing conduction torque pulses and added resistive and magnetic induced losses).

Figure 7A:
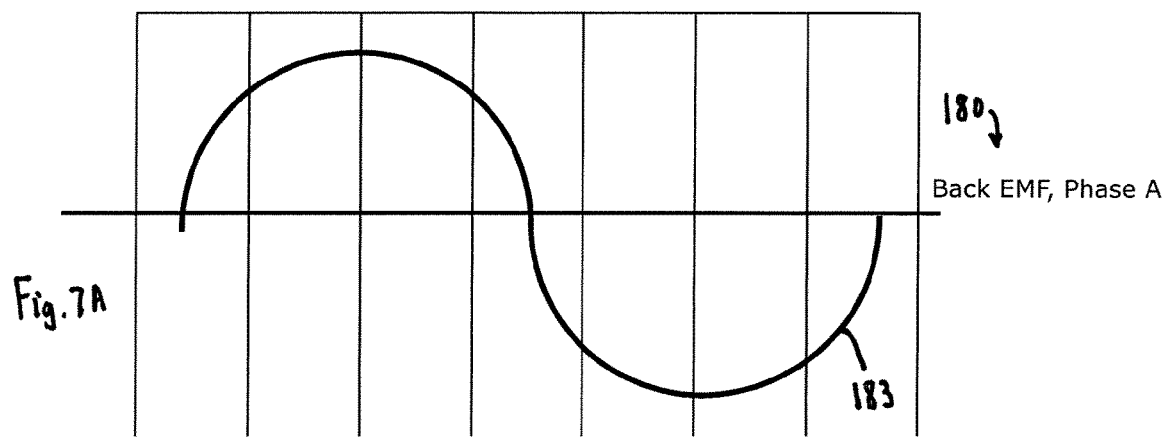
FIGS. 7A, 7B and 7C are plots of the back emf, variable voltage link regulation and drive output current waveforms of a motor drive for air core motors in accordance with the invention.
Figure 7B:
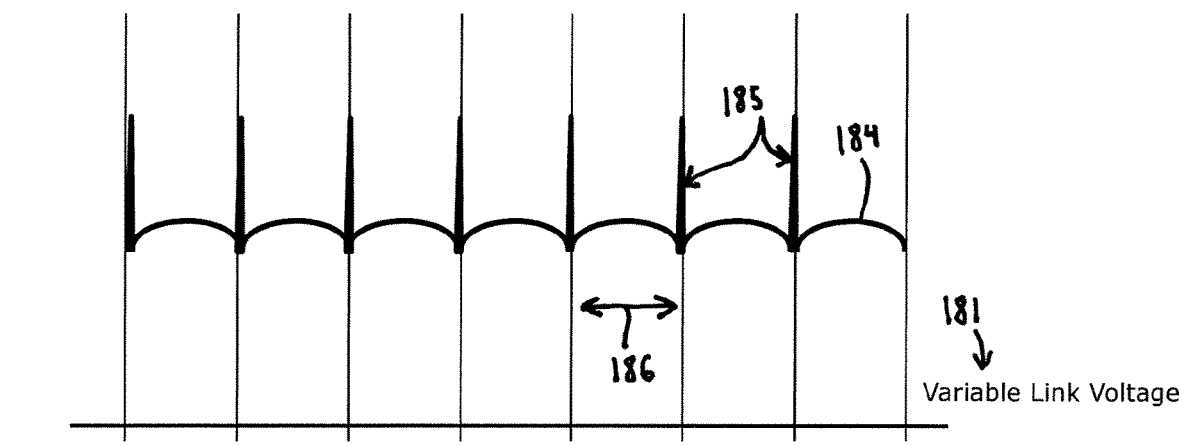
Figure 7C:
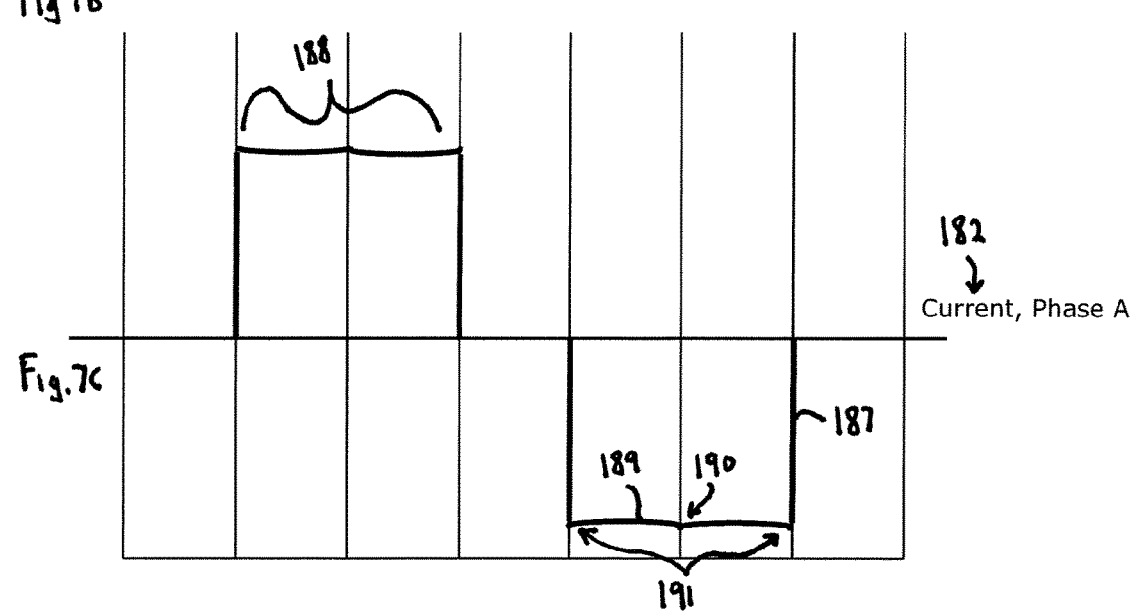

Not only is it desirable to prevent conduction torque pulses, but it is also desirable to mitigate generation of commutation torque pulses. Commutation torque pulse arises from the inability to instantly turn on current through phase windings at high speeds and also conduction of currents through the freewheeling diodes keeping current on longer when operating at low speeds. Plots of the back emf, variable voltage link regulation and drive output current waveforms of a motor drive for air core motors in accordance with the invention are shown in FIGS. 7A, 7B and 7C. The back emf 180 of each phase is sinusoidal 183. The variable link voltage 181 preferably tracks the shape of the combined phases 184 during conduction periods 186 of the output inverter 43 and increases or spikes the voltage 185 during commutation when switching one phase winding 46 off and another on. This allows the phase turning on to be turning on faster, reducing commutation torque ripple. It also allow the phase current 182 to take on the desired rectangular six-step shape 187 with near flat top 188, for maximum toque generation and motor efficiency. The phase current 182 may be slightly higher at the commutation events 190, 191, while slightly dipped areas during conduction 189, but is generally flat topped 188.

Figure 8A:
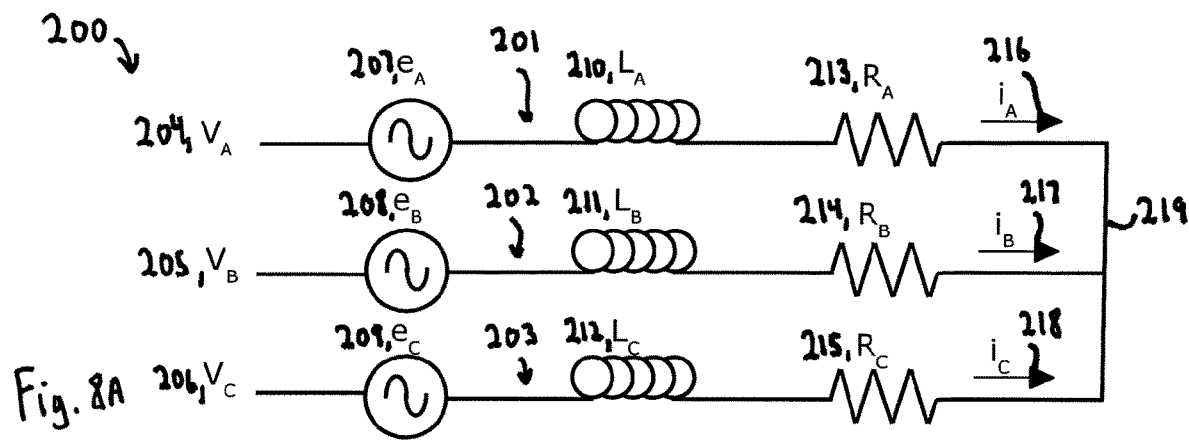
FIG. 8A is a circuit schematic of the three phase windings of an air core motor for use with a motor drive in accordance with the invention.

A circuit schematic of the three phase windings of an air core motor for use with a motor drive in accordance with the invention is shown in FIG. 8A. The schematic 200 shows each phase 201, 202, 203 comprises a phase voltage 204, 205, 206 that is the combination of the individual back emfs 207, 208, 209 along with the phase winding inductances 210, 211, 21 and phase winding resistances 213, 214, 215. Phase currents 216, 217, 218 all flow together into the center wye connection 219. The phase A voltage, 204 is equal to the sum of the back emf 207 plus the resistance 213 times the phase current 216.

Figure 8B:
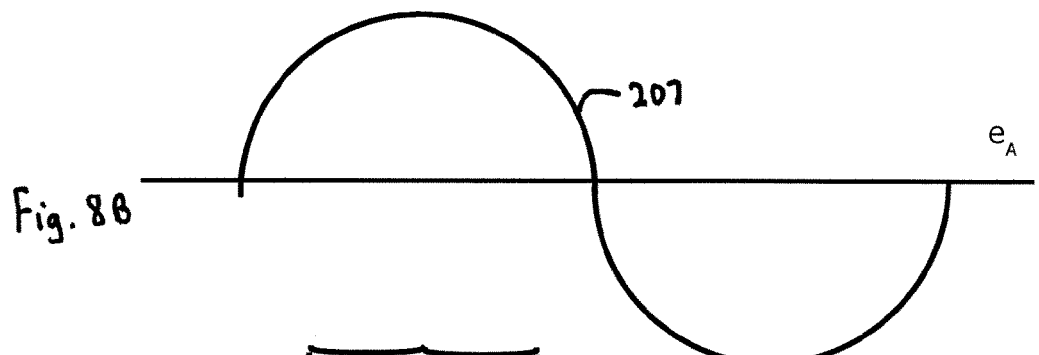
FIGS. 8B, 8C and 8D are plots of the windings back emf, windings phase current times resistance, and motor drive output voltage waveforms of a motor drive for air core motors in accordance with the invention.
Figure 8C:
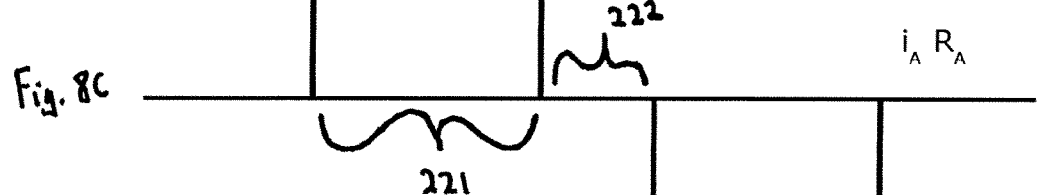
Figure 8D:
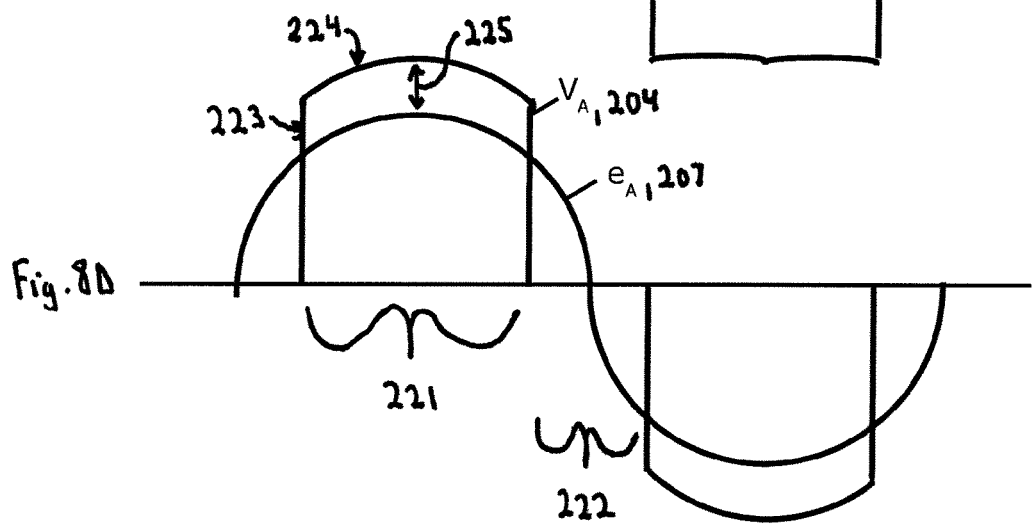

Plots of the windings back emf, windings phase current times resistance, and motor drive output voltage waveforms of a motor drive for air core motors in accordance with the invention are shown in FIGS. 8B, 8C and 8D. The back emf of phase A 207 is sinusoidal. The phase current of phase A times the resistance of the phase A winding is a rectangular six-stepped wave 220 with flat top 221 and off periods 222. The resulting drive output voltage waveform for phase A is then the sum of these voltages and is a sinusoidal-topped six step voltage waveform 204. The top 224 tacks the sinusoidal shape of the back emf 207 during conduction 221 having straight sides 233 and off periods 222.

A table illustrating the different conventional problems of six-step motor drives with motors and related solutions that were utilized to overcome each in accordance with the invention is shown in FIG. 9. From the table 230, torque ripple from slotted stator construction with cogging 231 is one common problem. This problem 231 is overcome through the use of air core motor construction 232. Air core motors have no stator pole teeth and hence have no cogging torque. Due to the lack of pole teeth, the armature winding are located inside the magnetic airgap between the rotor and stator backiron. This construction results in the armature windings having extremely low inductance, which is much lower that conventional slot wound motors.

A second problem can arise from substantial commutation torque ripple at higher speeds from the inability to increase current in phase windings fast enough 233. The ability to rapidly increase current in a phase winding is reduced by windings inductance. This problem is also overcome through the use of air core motor construction 234 inherently having very low inductance, up to several hundred times lower than slot wound motors. Air core construction allows for fast current response times and lower commutation torque ripple at high speeds A third problem can arise from the low inductance which is generation of stator drive induced harmonic losses from high frequency PWM ripple currents in the armature windings 235. To eliminate drive induced stator harmonic losses, the solution is to utilize a variable DC link to supply power to a non-modulated commutation-only drive output inverter 236. The motor armature windings no longer are required to serve as a filter inductance for high frequency switching, since smooth filtered current is provided to the non-modulating commutation-only inverter and coupled armature windings.

A fourth problem can arise causing current and torque ripple is from the inverter output voltage waveform mismatching the motor back emf waveform 237. If the two waveforms, do not match in shape, then current and resulting torque ripple will be generated. To eliminate this mismatch, the converter supplying the variable link and commutation-only inverter operates in current-mode control at a higher frequency and faster response time than the commutation period 238. The size of low pass filter inductance and capacitance is also set to be just right, or "Goldilocks" value for the frequencies of commutation and switching regulation. This allows the converter to maintain constant current during the conduction regions, as the voltage output waveform is automatically adjusted fast enough to emulate the back emf waveform.

Fifth and sixth problems can arise which include torque ripple being generated in the commutating regions from the turn off delay of the freewheel diodes of the phase turning off 239 and the turn on delay of the inductive time constant of the phase turning on 241. These problems 239, 241 are overcome by the converter operating in current-mode control maintaining constant current to the variable voltage link 240, and at high speeds being able to continue to maintain constant current through a supply voltage high enough to allow the converter to maintain constant current 242. The converter maintaining constant current in the commutation regions at high speed will cause the variable voltage link to periodically increase during commutation as it drives the ramp up of the current in the phase turning on faster, in order to maintain constant current in the variable voltage link.

Figure 10:
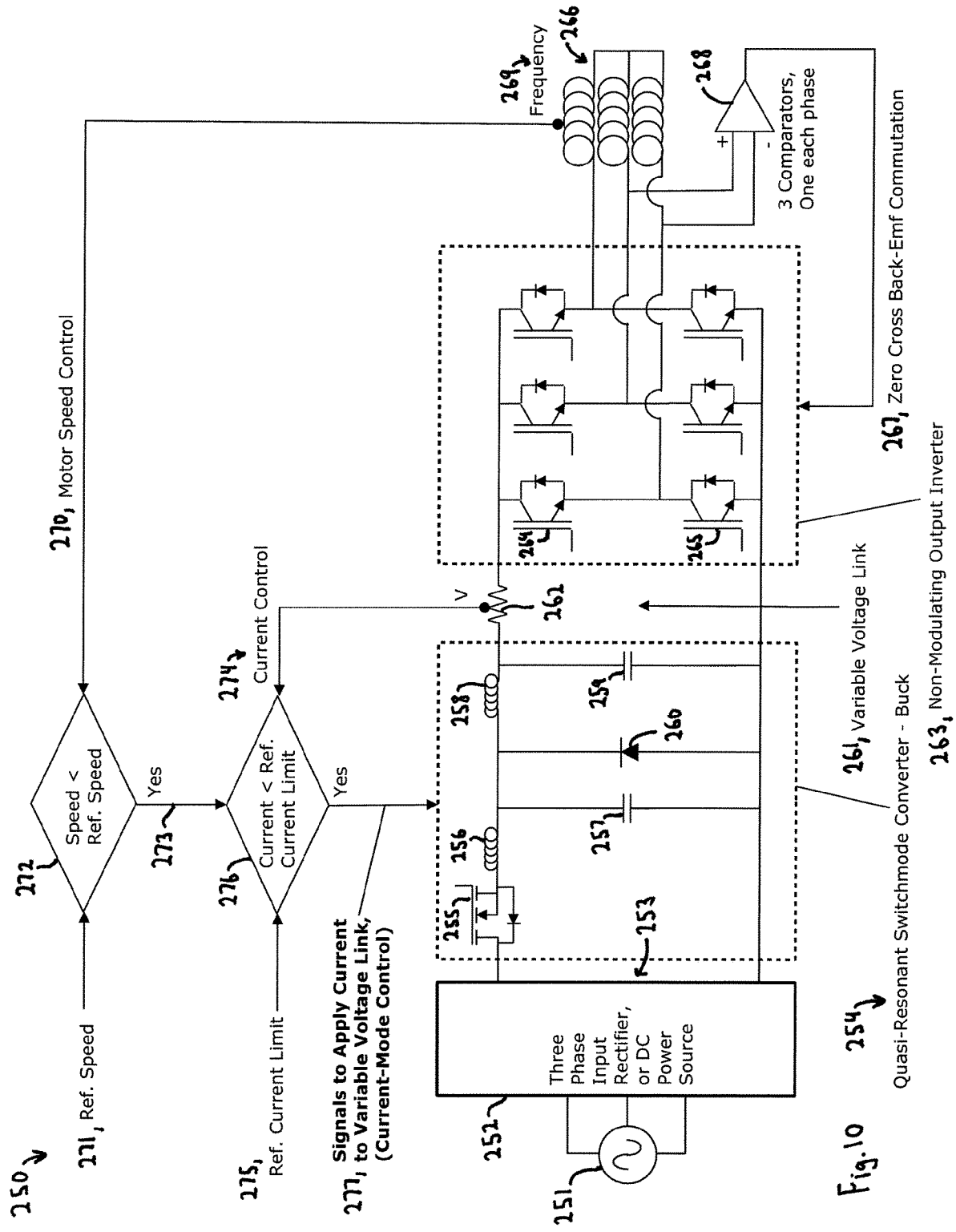
FIG. 10 is a schematic drawing of an alternate configuration motor drive for air core motors in accordance with the invention.

As shown previously in FIG. 2, the motor drive can comprise a conventional PWM switching buck converter. Alternatively, for higher efficiency and or higher frequency with reduce filter component size, the buck converter can comprise either a full resonant or quasi-resonant switching configuration second alternate configuration motor drive for air core motors in accordance with the invention is shown in FIG. 10. The motor drive 250 comprises a six-step drive that employs a quasi-resonant buck converter stage. The drive 250 receives AC supply power 251 into a three phase power rectifier 252 that rectifies it to DC input supply power 253. When the motor drive is operated from DC power directly, the rectifier 252 may be omitted. The DC input supply power 253 powers a quasi-resonant switchmode converter that provides regulated current to variable voltage link 261. The variable voltage link powers a non-modulating, or commutation-only, inverter that provides commutation switching to the motor armature windings 266. The quasi-resonant buck converter 254 is comprised of a SiC MOSFET 255 switching at high frequency with low losses due to resonance and soft switching. Inductor 256 and capacitor 257 provide for resonance, while the low pass filter inductance 258 and capacitance are ideally set to provide for the back emf tracking capability in accordance with the invention. The output diode 260 conducts the filter inductor 259. The output of the buck converter 254 feeds a variable dc link 261 and resistor 262 is inserted to allow for link current measurement. The variable dc link 261 powers the non-modulated output inverter 263 with direct current. The output inverter 263 comprises six IGBTs 264, 265 that provide commutation-only switching. As a result, no high frequency PWM regulation switching is passed to the armature windings 266 thereby eliminating any drive induced harmonic losses in the stator of the motor for highest efficiency. The motor is primarily a transducer for converting between electrical and shaft mechanical power and not a filter. An additional benefit of the motor drive 263 is that common mode currents are completely eliminated. There are no shaft bearing currents generated, and resulting discharge bearing pitting and failures are precluded. The motor drive 263 is commutated by zero cross commutation 267 wherein the output inverter 263 acts the same as a mechanical commutator in a brushed DC motor. Three comparators 268 monitor the back emf of the armature windings 266 for zero crossing when not excited. The signals from the comparators 268 activate commutation advancement 267 in the output inverter 263. Motor speed control 270 is accomplished by monitoring the frequency 269 on the armature windings 266 and regulating 272 by on/off control against a reference speed signal 271 for setting the speed of the motor. If the motor speed 270 is less than the reference speed 271 an output signal 273 signals the motor drive to apply acceleration current and torque. If the signal 273 to apply torque is present, the current control 274 sets the level of current to the variable dc link 261 by monitoring the voltage 274 across the resistor 262, or the current. The monitored current is compared against the reference current limit 253 and signals to apply full current to the variable dc link 240 through operation of the buck converter 275 in current-mode control. There are several different methods for providing current-mode control and each is acceptable so long as it is stable over the operating range of the drive and preferably provides fast and accurate response. The switching regulation of the buck converter 254 is preferably at high frequency so as to reduce the size of the filter inductor 258 and filter capacitor 259. It is also preferably to be significantly higher than the commutation frequency so that the current control can prevent current pulses during conduction regions from mismatches that would otherwise arise between the back emf and the drive output voltage. To provide for reduced switching losses in the MOSFET 255 and also allow for yet even higher switching frequency with resulting reduced size filter inductor 258 and filter capacitor 259, quasi-resonant switching is enabled. For quasi-resonant switching of MOSFET 255, resonant inductor 256 and resonant capacitor 257 are added to the buck converter 254. As a result, the MOSFET 255 is enabled to be switched with lower losses and reduced generation of EMI Other resonant configuration buck converters could alternatively be employed with the motor drive in accordance with the invention to reduced losses, including more complex quasi-resonant versions that also enable zero-voltage-switching, as well as full resonant converters such as LLC or other. One such topology can even allow constant frequency control. In this version of PWM quasi-resonant converter, the diode 260 includes another semiconductor switch in parallel.

Figure 11:
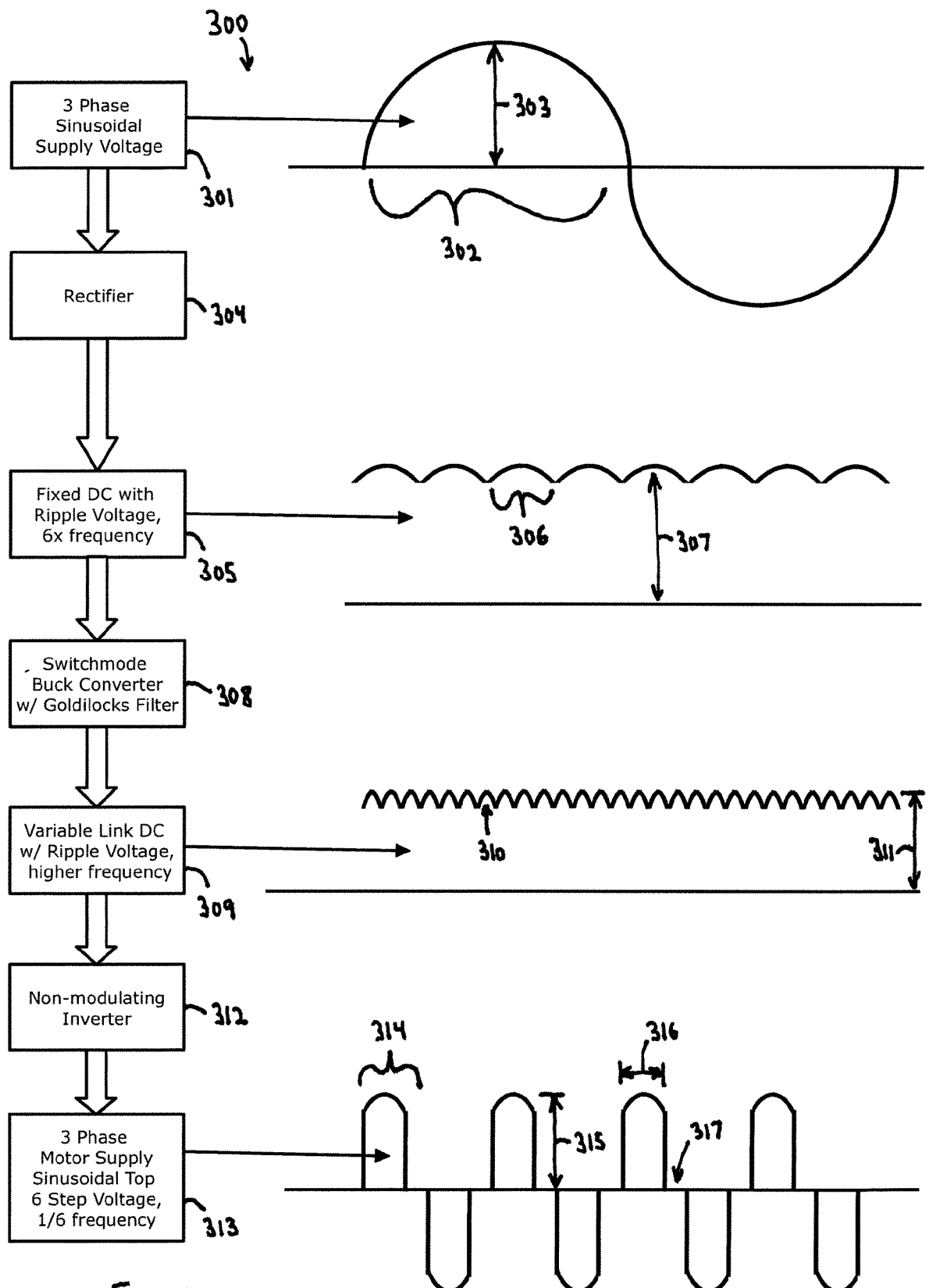
FIG. 11 is a diagram of the power conversion functioning steps and the related voltage waveforms for each of a motor drive for air core motors in accordance with the invention.

A diagram of the power conversion functioning steps and the related voltage waveforms for each of a motor drive for air core motors in accordance with the invention is shown in FIG. 11. The power conversion functioning 300 takes in three phase sinusoidal supply voltage 301 of amplitude 303 and frequency 302. The three phase voltage 301 is rectified by a rectifier 304 to produce fixed DC with ripple voltage 305. The amplitude 307 is equal to the amplitude 303 but ripple frequency 306 is six times the supply frequency 302. The fixed DC with ripple voltage is coupled to a switchmode buck converter with Goldilocks filter 308 that converts it to variable link DC with ripple voltage 309. The amplitude 311 varies for driving the motor and is lower than amplitude 303. The ripple voltage 310 is several times higher than ripple frequency 306. The variable link DC with ripple voltage powers a non-modulating inverter 312 that converts it to three phase motor supply power 313 with sinusoidal top and six-step voltage. The amplitude 315 is the same as amplitude 311 however the frequency 316 is $\frac{1}{6}^{th}$ the frequency 310. The waveforms 314 are six-stepped with off periods 317 between reversing polarity.

Obviously, numerous modifications and variations of the described preferred embodiment are possible and will occur to those skilled in the art in light of this disclosure of the invention. Accordingly, we intend that these modifications and variations, and the equivalents thereof, be included within the spirit and scope of the invention as defined in the following claims, wherein we claim:

The invention claimed is:
1. An electronic motor drive for powering permanent magnet air core synchronous motors having sinusoidal back emf;

said motor drive comprising a switchmode power converter coupled to a connection of an input power supply, said power converter converts power from said input power supply with a current-mode control output and provides regulated current to a variable voltage link;

said variable voltage link is coupled to and supplies said regulated current to a non-modulating commutation inverter that energizes multi-phase air core armature windings of said air core motor;

said motor drive employing 6-step commutation exciting only two of the phases during conduction periods;

said switchmode power converter comprises a low pass inductance and capacitance filter ahead of a power supply of said commutation inverter, wherein said regulated current is switched at a regulation frequency high enough to preclude significant switching induced harmonic ripple currents to said air core armature windings combined with said filter inductance having a value that is less than the inductance of said multi-phase windings as measured across two legs of said windings, and said low pass filter inductance and capacitance simultaneously have values low enough to allow an output voltage of said motor drive to track the sinusoidal shape of the back emf waveforms during conduction periods of said output inverter, wherein said low pass inductance and capacitance filter has a cut off frequency that is less than or equal to about one-half of said current switching regulation frequency but at least about five times that of said commutation frequency of said output inverter, wherein said filter is further sized to provide substantially flat-topped regulated phase currents that track the shape of the back-EMF waveform of the connected motor during conduction periods while attenuating switching ripple at said switching frequency.

2. The electronic motor drive as described in claim 1 wherein:

said motor drive simultaneously provides sinusoidal-shaped-top 6-step voltage waveform with a rectangular shaped 6-step current waveform to said air core armature windings during said conduction periods of said output inverter.

3. The electronic motor drive as described in claim 1 wherein:

said current regulation combined with said low pass filter causes the voltage waveforms supplied by said motor drive to said multi-phase air core armature windings to imitate said shape of said back emf waveforms during said conduction periods of said output inverter.

4. The electronic motor drive as described in claim 1 wherein:

said supply power has a peak voltage that is at least twice the maximum peak value of said back emf measured across two legs of said air core motor windings when said motor is operating at full speed, thereby reducing commutation torque ripple of said air core synchronous motor.

5. The electronic motor drive as described in claim 1 wherein:

said power supply comprises AC utility power which is converted to DC by an uncontrolled rectifier prior to being supplied to said switchmode power converter, wherein filter capacitance across said DC and after said uncontrolled rectifier is sufficiently low such that the power factor reflected to said AC utility power exceeds 0.90 without the use of any active power factor correction.

6. The electronic motor drive as described in claim 1 wherein:

said switchmode power converter comprises a quasi-resonant buck converter.

7. The electronic motor drive for powering permanent magnet air core synchronous motors having sinusoidal back emf;

said motor drive comprising a switchmode power converter coupled to a connection of input supply power that converts said supply power with a current-mode control output and the provides regulated current to a variable voltage link;

said variable voltage link is coupled to and supplies said regulated current to a non-modulating commutation inverter that energizes multi-phase air core armature windings of said air core motor;

said motor drive employing stepped commutation exciting two of the phases during conduction periods;

said switchmode power converter comprises a low pass inductance and capacitance filter prior to said variable voltage link supplying said commutation inverter, wherein said current regulation combined with said low pass filter causes a voltage waveform of said variable voltage link to imitate the combined back emfs of said multi-phase air core armature windings during conduction periods of said commutation inverter, wherein said low pass inductance and capacitance filter has a cut off frequency that is less than or equal to about one-half of a current switching regulation frequency of said switchmode power converter but at least about five times that of a commutation frequency of said output inverter, such that said motor drive produces substantially flat-topped phase currents that emulate the back-EMF waveform of the motor during conduction periods and switching ripple at said switching frequency is attenuated.

8. The electronic motor drive as described in claim 7 wherein:

said motor drive simultaneously provides sinusoidal-shaped-top 6-step voltage waveform with a rectangular shaped 6-step current waveform to said air core armature windings during said conduction periods of said output inverter.

9. The electronic motor drive as described in claim 7 wherein:

said low pass inductance and capacitance filter comprises a total serial inductance in between said switchmode converter and said non-modulating commutation inverter with a value that is less than the inductance across two legs of said multi-phase air core armature windings.

10. The electronic motor drive as described in claim 7 wherein:

said supply power comprises AC utility power which is converted to DC by an uncontrolled rectifier prior to being supplied to said switchmode power converter, wherein filter capacitance across said DC and after said uncontrolled rectifier is sufficiently low such that the power factor reflected to said AC utility power exceeds 0.90 without a use of any active power factor correction.

11. The electronic motor drive as described in claim 7 wherein:

said switchmode power converter comprises employs resonance to enable zero-voltage switching.

12. The electronic motor drive as described in claim 7 wherein:
said motor drive reduces commutation torque ripple of said air core synchronous motor by said supply power having a peak voltage that is at least twice the maximum peak value of said back emf measured across two legs of said air core motor windings when said motor is operating at full speed.

13. An electronic motor drive for powering permanent magnet air core synchronous motors having sinusoidal back emf;
said motor drive comprising a switchmode power converter coupled to a connection of supply power that converts said supply power with a current-mode control output and the provides regulated current to a variable voltage link;
said variable voltage link is coupled to and supplies said regulated current to a non-modulating commutation inverter that energizes multi-phase air core armature windings of said air core motor;
said motor drive employing 6-step commutation exciting only two of the phase legs during conduction periods;
said supply power comprises three-phase sinusoidal AC voltage of fixed supply power voltage amplitude and supply power frequency;
a rectifier connected to said supply power converts said supply power voltage into an input DC voltage with ripple having six times the frequency of said supply power frequency;
said switchmode power converter supplied by said rectifier comprises a buck converter with low pass inductance and capacitance filter that converts said input DC voltage with ripple into variable voltage link DC voltage with ripple having a higher frequency higher than said input DC voltage with ripple;
said non-modulating commutation inverter coupled to said variable voltage link converts said variable link DC voltage with ripple into three-phase AC motor supply power, with each phase voltage comprising sinusoidal-shaped-top 6-step voltage waveforms having frequency equal to $\frac{1}{6}^{th}$ the frequency of said variable voltage link DC voltage with ripple.

14. The electronic motor drive as described in claim 13 wherein:
said supply power comprises AC utility power which is converted to DC by an uncontrolled rectifier prior to being supplied to said switchmode power converter, wherein filter capacitance across said DC and after said uncontrolled rectifier is sufficiently low such that the power factor reflected to said AC utility power exceeds 0.90 without the use of any active power factor correction.

15. The electronic motor drive as described in claim 13 wherein:
said low pass inductance and capacitance filter comprises a total serial inductance in between said switchmode converter and said non-modulating commutation inverter with a value that is less than the inductance across two legs of said multi-phase air core armature windings.

16. The electronic motor drive as described in claim 13 wherein:
said low pass inductance and capacitance filter has a cut off frequency that is less than half of the current switching regulation frequency but more than five times that of the commutation frequency of said output inverter.

17. The electronic motor drive as described in claim 13 wherein:
said current regulation combined with said low pass filter causes the voltage waveform of said variable voltage link to imitate the combined back emfs of said multi-phase air core armature windings during the conduction periods of said output inverter.

18. The electronic motor drive as described in claim 13 wherein:
said motor drive reduces commutation torque ripple of said air core synchronous motor by said supply power having a peak voltage that is at least twice the maximum peak value of said back emf measured across two legs of said air core motor windings when said motor is operating at full speed.

19. The electronic motor drive as described in claim 13 wherein:
said switchmode power converter employs resonance to enable zero-voltage-switching.

20. The electronic motor drive as described in claim 13, wherein said commutation is position-sensor-less and controlled through measurement of the back emf.

* * * * *